United States Patent [19]

Neu

[11] 4,145,284
[45] Mar. 20, 1979

[54] METHOD FOR MAKING POLYMERIC FILTER AIDS AND PRODUCTS THEREOF

[75] Inventor: Ernest L. Neu, Redondo Beach, Calif.

[73] Assignee: Grefco, Inc., Bala Cynwyd, Pa.

[21] Appl. No.: 890,030

[22] Filed: Mar. 24, 1978

[51] Int. Cl.$^2$ ............................................. B01D 37/02
[52] U.S. Cl. ...................................... 210/75; 210/503
[58] Field of Search ..................... 210/75, 502, 503; 428/402

[56] References Cited

U.S. PATENT DOCUMENTS

| | | | |
|---|---|---|---|
| 2,770,241 | 11/1956 | Winkler | 131/265 |
| 2,961,710 | 11/1960 | Stark | 264/54 |
| 3,429,655 | 2/1969 | Case | 423/241 |
| 3,538,020 | 11/1970 | Heskett et al. | 210/496 |
| 3,557,955 | 1/1971 | Hirs et al. | 210/67 |
| 3,630,820 | 12/1971 | Leach | 428/402 |
| 3,658,184 | 4/1972 | Davis et al. | 210/504 |
| 3,905,910 | 9/1975 | Coombs et al. | 252/259.5 |
| 4,028,255 | 6/1977 | Bolto et al. | 210/75 |

FOREIGN PATENT DOCUMENTS 1052191 12/1966 United Kingdom.

*Primary Examiner*—Frank Sever
*Attorney, Agent, or Firm*—Brian G. Burnsvold; Allen M. Sokal; Everett H. Murray, Jr.

[57] ABSTRACT

Improved, low-cost filter aid materials are made from polyurethane and related polymers. A foam of the polymeric material is comminuted to eliminate substantially all closed cells. The resulting particles are graded to a desired average particle size.

3 Claims, 2 Drawing Figures

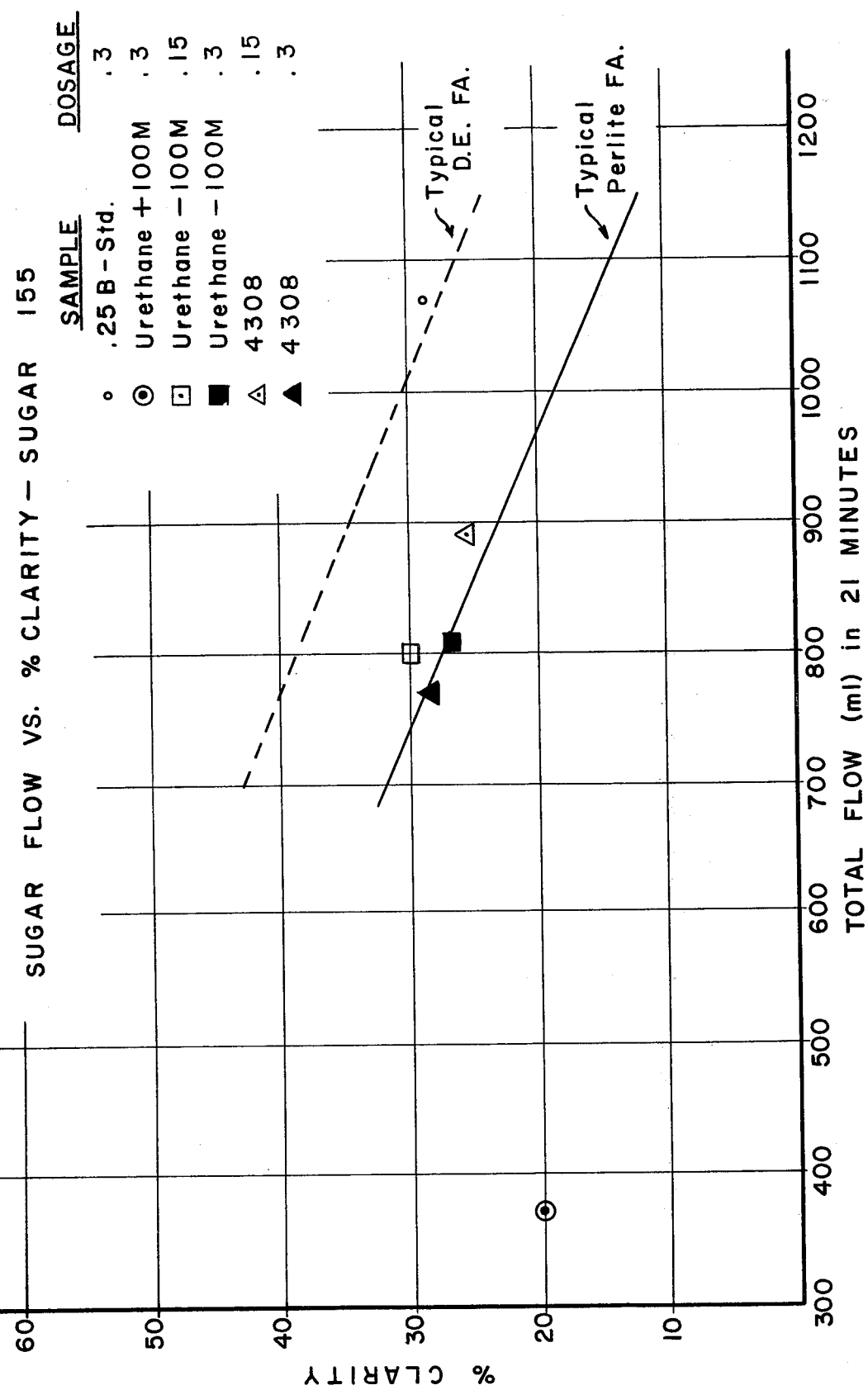

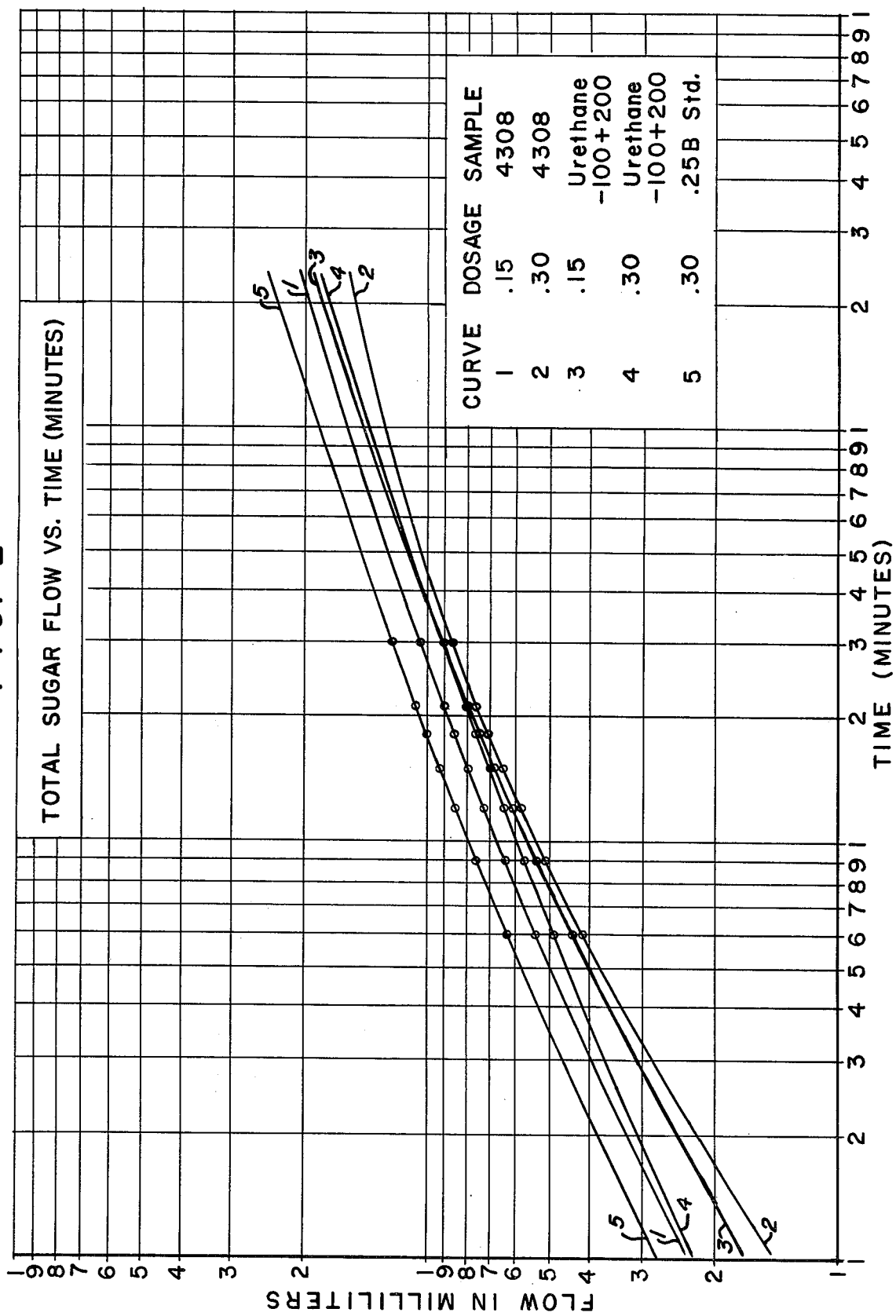

METHOD FOR MAKING POLYMERIC FILTER AIDS AND PRODUCTS THEREOF

BACKGROUND OF THE INVENTION

1. Field of the Invention

This invention relates to an improved filter aid material for removing finely divided insoluble materials from liquids and the method of making and using the filter aid material.

2. Description of the Prior Art

A long-standing problem has been the removal of finely divided insoluble materials from liquids. One manner of doing this is by filtration, wherein the liquid flows under pressure through a filter medium. If the pores of the filter medium, however, are too small, the filters are too inefficient and, therefore, too expensive to handle large amounts of liquid. Coarser filters, on the other hand, such as rapid sand filters, require a pretreatment of the liquid that is to be filtered to cause coalescence of the insoluble materials or require the addition of a filter aid material. Pretreatment to cause coalescence is expensive except on a large scale. Consequently, the art has turned to filter aid filtration.

In filter aid filtration, a relatively small amount of finely divided particulate material is added to the liquid to be filtered so that a porous cake of the filter aid material builds up on the filter medium surface and entraps the insoluble materials in the liquid. The pores in the filter cake formed by the filter aid material are smaller than those of the filter medium. The finely divided filter aid material must form a stable, highly permeable, and retentive layer. The particles must remain as discrete particles and not agglomerate and the filter cake must not collapse during filtration. The ultimate objective of the filter aid material is to remove as much of the finely divided insoluble material from the liquid as possible in the shortest possible time and with the smallest possible increase in pressure.

In the past, the filter aid materials most generally used have been diatomaceous silica, perlite, carbon, and fibrous material, such as cellulose and asbestos. Many conventional materials, however, are unsuitable for specialty applications. For example, diatomaceous silica and perlite are unsatisfactory for caustic filtration and the filtration of acids. They also cannot be used when recovering solids from a liquid by burning the filter cake, because diatomaceous silica and perlite leave a residue.

It is an object of the present invention to provide a highly efficient and cheap filter aid material.

It is a further object of this invention to provide a method for making the novel filter aid material of the present invention.

It is a further object of this invention to provide a method of filtering liquid using the novel filter aid material of the present invention.

It is a further object of this invention to provide a filter aid material that can be used for specialty applications that conventional filter aid materials are unsuitable for.

Other objects will be apparent from the following description of the invention.

SUMMARY OF THE INVENTION

To achieve the foregoing objects and in accordance with the purpose of the invention, as embodied and broadly described herein, the filter aid material of the invention comprises particulate expanded polymer, the preferred polymer being polyurethane. All conventional expandable polymers, however, can be used. For example, related polymers, such as polyisocyanates, polystyrene, and polyphenolformaldehydes can also be used. The filter aid material is formed by comminuting the polymeric foam to eliminate substantially all closed cells and grading the resulting particles to a desired average particle size. The filter aid material is used by adding an effective amount to the liquid to be filtered and filtering the liquid through a filter medium.

BRIEF DESCRIPTION OF THE DRAWINGS

The accompanying drawings, which are incorporated in and constitute a part of this specification, together with the description, serve to explain the principles of the invention.

FIG. 1 is a plot comparing clarity achieved with filter aid material in accordance with the present invention with that achieved using conventional materials.

FIG. 2 is a plot comparing flow as a function of time for materials in accordance with the invention and conventional materials.

DETAILED DESCRIPTION AND PREFERRED EMBODIMENTS

Reference will now be made in detail to the presently preferred embodiments of the invention.

The preferred polymer in accordance with this invention is polyurethane. All conventional expandable polymers, such as, for example, polyisocyanates, polystyrene, and polyphenolformaldehydes, may also be used.

The polymeric foams may be made by conventional processes for producing open-celled or closed-celled foams, and waste foam materials may advantageously be used.

The expanded polymer may be comminuted and graded to sizes corresponding to those used for conventional filter aids, such as perlite and diatomaceous earth. Similarly, the amounts of filter aid material used may be the same as dosages for conventional materials.

Many foam materials are too light and insufficiently rigid for comminution in several types of milling equipment, such as, e.g., a jaw crusher, a vibrating sander, or a mortar and pestle. Comminution of such foams, for example waste urethane, may be carried out by attrition milling, which is similar to the action of a belt sander, used with a suitable collecting system, such as a baghouse. This produces a fine powder suitable for use as a filter aid.

The invention is illustrated, but not limited, by the following examples of the invention and comparative examples.

EXAMPLE I

Using a belt sander, several blocks of polyurethane foam were milled and the resulting fine material collected in a small baghouse. Of the total weight milled, 32.7% was picked up in the baghouse and 42.5% of the material was recovered from the top of the sander. The balance was lost as dust.

Using the material from the baghouse as the sample, a dry screen analysis was completed.

|      | + 20 mesh  | 0%    |
|------|------------|-------|
| − 20 | + 30 mesh  | Trace |
| − 30 | + 50 mesh  | Trace |
| − 50 | +100 mesh  | 46.3  |

-continued

| | | |
|---|---|---|
| −100 | +200 mesh | 50.5% |
| −200 | +325 mesh | 2.1% |
| −325 | | 1.1% |

Since the fine urethane particles do not readily wet with water, a surface active agent was added to test for permeability flow rate volume (PFR$_v$) and permeability cake density (PCD).

| | PFR$_v$* | PCD |
|---|---|---|
| Composite Sample | 127 | 10.0 |
| − 50 +100 Mesh Fraction | 190 | 8.3 |
| −100 +200 Mesh Fraction | 135 | 11.8 |

*ratio based upon Darcy units

Sugar flow rate and clarity were measured for the composite sample above, and were compared to Dicalite D.E. (diatomaceous earth) and perlite filter aids in the standard test except that "A" sugar, a crude sugar solution that is difficult to clarify, was used. The results are set forth in Table I.

TABLE I

| Sample | Dosage | Flow 21 Min. | Clarity-JTU's (400–450 ml.) |
|---|---|---|---|
| 2500 DL-7229 (medium flow rate diatomite) | .3 | 805 | 17.5 |
| 4200 DL-8393 (high flow rate diatomite) | .3 | 1,000 | 19.5 |
| 25B STD, DL-4023 (high flow rate diatomite) | .3 | 1,095 | 20.0 |
| Urethane Composite | .3 | 675 | 20.5 |
| Urethane Composite | .15 | 745 | 22.0 |
| 476 Special (low flow rate perlite) | .3 | 750 | 19.0 |
| 4106 DL-7947 (high flow rate perlite) | .3 | 740 | 19.0 |
| CP-175 DL-6625 (medium flow rate perlite) | .3 | 870 | 20.0 |
| 4156 DL-7090 (high flow rate perlite) | .3 | 895 | 22.0 |
| 4308 AD-158 (high flow rate perlite) | .3 | 855 | 20.5 |
| 4358 AD-159 (high flow rate perlite) | .3 | 1,050 | 22.0 |

Based on the data, one would judge the samples of unclassified urethane a poorer filter aid than some perlite materials, but the data show that the unclassified urethane material was as good as other standard materials at lower dosage and performed better at lower dosage in terms of flow-rate. This demonstrates that considerably lower quantities of the filter aid material of the present invention can sometimes be used.

EXAMPLE II

Sugar flow rate tests were run on the coarse and fine fractions of milled urethane foam filter aids to compare these filter aids to commercial perlite filter aids. The results are set forth in Table II and FIGS. 1 and 2.

TABLE II

URETHANE FILTER AID VS. LIGHT DENSITY PERLITE FILTER AIDS

Sugar Test #155 Sugar

| Sample | PFR$_v$ | PCD | Cake Thickness | FR 21 Min | % Clarity | Turbity JTU | Dosage % | Remarks |
|---|---|---|---|---|---|---|---|---|
| Urethane +100 mesh | 228 | 13.6 | — | — | — | — | .15 | Plugged |
| Urethane +100 mesh | 228 | 13.6 | 12/32 | 370 | 30.0 | 19.5 | .30 | Not Plotted |
| Urethane −100 mesh | 152 | 16.4 | 12/32 | 800 | 30 | 19.5 | .15 | 3rd Best Curve |
| Urethane −100 mesh | 152 | 16.4 | 24/32 | 810 | 26.5 | 20.5 | .30 | 2nd Best Curve |
| 4308 (high flow rate perlite) | 160 | 9.5 | 18/32 | 890 | 25.5 | 20.8 | .15 | Best Curve |
| 4308 (high flow rate perlite) | 160 | 9.5 | 36/32 | 765 | 28.5 | 20.0 | .30 | Worst Plugging Curve |
| 25B Std. (high flow rate diatomite) | 166 | 22.3 | 20/32 | 1070 | 28.5 | 20.0 | .30 | Standard Curve |

As is apparant, the coarse fraction of the milled urethane filter aid (+100 mesh) does not perform satisfactorily at 0.15 or 0.30% dosage, plugging completely at the low dosage. The finer fraction (−100+200 mesh) was about equal to the low density perlite filter air tested (see Table II and FIG. 1).

This data demonstrates that the filtration characteristics of filter aids produced from milled and classified urethane foam may be as good as low density perlite filter aid.

The −100+200 mesh fraction exhibited higher PFR$_v$ and PCD than in the previous example, although it did not screen as well. Although the sample tested at 0.15% dosage appears to have better clarity than the 0.3% dosage, it showed more of a tendency to plug.

The conclusion of this work is that filter aids made from milled urethane foam may perform as well as existing perlite filter aids and, therefore, provide a valuable substitute for conventional filter aid materials, especially in environments that diatomite and perlite are unsatisfactory in. For example, the filter aids disclosed herein are quite suitable for specialty applications such as caustic or acid filtration. Furthermore, because the filter cake of the filter aids disclosed herein burns without residue, the filter aids can be used to recover solids from a liquid by burning.

It will be apparent to those skilled in the art that various modifications and variations could be made in the filter aid materials of the invention without departing from the scope or spirit of the invention.

What I claim is:

1. A method of filtering a liquid comprising:
adding to the liquid an effective amount of filter aid material consisting essentially of particulate expanded polymer formed by comminuting polymeric foam to eliminate substantially all closed cells and grading to a desired average particle size range smaller than 100 mesh and larger than 200 mesh, and filtering the liquid through a filter medium.

2. The method of claim 1, wherein said polymeric foam is polyurethane.

3. The method of claim 1, wherein said polymeric foam is a waste foam material.

Notice of Adverse Decision in Interference

In Interference No. 100,555, involving Patent No. 4,145,284, E. L. Neu, METHOD FOR MAKING POLYMERIC FILTER AIDS AND PRODUCTS THEREOF, final judgment adverse to the patentee was rendered Jan. 19, 1982, as to claims 1 & 3.

[*Official Gazette April 6, 1982.*]